United States Patent
Ferri et al.

(10) Patent No.: US 7,120,901 B2
(45) Date of Patent: Oct. 10, 2006

(54) METHOD AND SYSTEM FOR TRACING AND DISPLAYING EXECUTION OF NESTED FUNCTIONS

(75) Inventors: Luca Ferri, Rome (IT); Luigi Pichetti, Rome (IT); Rosario Gangemi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 10/235,599

(22) Filed: Sep. 5, 2002

(65) Prior Publication Data
US 2003/0159133 A1    Aug. 21, 2003

(30) Foreign Application Priority Data
Oct. 26, 2001   (EP)   .................. 01480099

(51) Int. Cl.
G06F 9/44       (2006.01)
G06F 11/00      (2006.01)

(52) U.S. Cl. ................ 717/128; 717/127; 717/130; 714/45; 714/48

(58) Field of Classification Search ........... 717/124, 717/125, 126, 127, 128, 129, 130; 714/45, 714/48
See application file for complete search history.

(56) References Cited

U.S. PATENT DOCUMENTS

| | | | | |
|---|---|---|---|---|
| 4,462,077 A | * | 7/1984 | York ........................... 714/45 |
| 4,965,717 A | * | 10/1990 | Cutts et al. ................... 714/12 |
| 5,119,377 A | * | 6/1992 | Cobb et al. ................... 714/38 |
| 5,327,568 A | * | 7/1994 | Maejima et al. ............. 717/147 |
| 5,598,564 A | * | 1/1997 | Barker, III ................... 717/126 |
| 5,724,505 A | * | 3/1998 | Argade et al. ................ 714/45 |
| 5,748,878 A | * | 5/1998 | Rees et al. ................... 714/38 |
| 5,852,449 A | * | 12/1998 | Esslinger et al. ........... 345/473 |
| 5,898,873 A | * | 4/1999 | Lehr .......................... 717/125 |
| 5,903,759 A | * | 5/1999 | Sun et al. ................... 717/128 |
| 5,960,199 A | * | 9/1999 | Brodsky et al. ............ 717/128 |
| 6,002,872 A | * | 12/1999 | Alexander et al. .......... 717/127 |
| 6,079,032 A | * | 6/2000 | Peri ............................ 714/38 |
| 6,126,329 A | * | 10/2000 | Bennett et al. ............ 717/127 |
| 6,158,024 A | * | 12/2000 | Mandal ....................... 714/37 |

(Continued)

OTHER PUBLICATIONS

Tivoli Software Distribution Reference Manual Version 4.0.

(Continued)

Primary Examiner—Wei Zhen
Assistant Examiner—Qamrun Nahar
(74) Attorney, Agent, or Firm—Duke W. Yee; Jeffrey S. LaBaw; Francis Lammes (57) ABSTRACT

A method and system for tracing the failing or successful execution of nested functions coded with return codes in a thread during its execution. The method comprises an ENTRY and EXIT trace macro to mark the beginning and the end of execution of the function, a TRACE macro to record messages and program variable values, and a QUIT macro marking the failing execution of the corresponding function. Using a Graphical User Interface, an interactive trace analyzer reads the trace file and displays the tree structure of the nested functions and marks, by using different colors, the success or failure of each of them. The trace analyzer utilities help the user to quickly identify the error in the source code corresponding to a function with a failing execution.

33 Claims, 4 Drawing Sheets

U.S. PATENT DOCUMENTS

| | | | | |
|---|---|---|---|---|
| 6,161,216 A | * | 12/2000 | Shagam | 717/128 |
| 6,202,199 B1 | * | 3/2001 | Wygodny et al. | 717/125 |
| 6,230,313 B1 | * | 5/2001 | Callahan et al. | 717/128 |
| 6,269,276 B1 | * | 7/2001 | Akhavan et al. | 700/97 |
| 6,353,923 B1 | * | 3/2002 | Bogle et al. | 717/128 |
| 6,493,868 B1 | * | 12/2002 | DaSilva et al. | 717/105 |
| 2002/0095661 A1 | * | 7/2002 | Angel et al. | 717/130 |
| 2003/0023956 A1 | * | 1/2003 | Dulberg et al. | 717/130 |

OTHER PUBLICATIONS

Research Disclosure Nov. 1998 No. 415, Article No. 41583, "Trace Viewer", p. 1513.

* cited by examiner

METHOD AND SYSTEM FOR TRACING AND DISPLAYING EXECUTION OF NESTED FUNCTIONS

FIELD OF THE INVENTION

The present invention generally relates to the field of program debugging; more particularly, the invention relates to a tool for generating and analyzing a trace of the execution of nested functions.

BACKGROUND OF THE INVENTION

When programs are coded with programming languages using symbolic names, such as Java™ programming language, a 'debugger' program can be used. (Java is a trademark of Sun Microsystems, Inc. in the United States, other countries, or both). A debugger is a program controlling the execution of a program to be debugged, allowing a developer or programmer to step through the program, catch data, and monitor conditions, such as values of variables, to correct a problem. When the programming language does not use symbolic names, one other way to debug a program is to include, at strategic points in the code, macro instructions which will generate a trace in a trace file at execution time. The trace file is analyzed after execution with a trace analyzer.

Basically, a trace tool provides parameter tracing for dumping to the trace file the parameters provided to a function, entry-exit tracing to follow a calling sequence of functions, and event tracing to track the occurrence of specific events in a program. TraceMon Plus is a tracing and logging utility for Visual C++® 6.0 language sold by TWI AG (Technisch-wissenschaftliche Informatik). (Visial C++ is a trademark of Microsoft Corporation in the United States, other countries, or both.) TraceMon Plus consists of a TMPlus program and a trace analyzer CTracer. In TraceMon Plus, in order to follow execution of functions in the code, a trace is activated with a CTRACE SCOPE, a macro used at an entry point of a function. This macro detects when the function exits.

With most of the tracing tools available today, after the trace macros have been inserted in the source code, at execution time the trace elements are generated and stored in a trace file. A convenient function of a trace analyzer enables users to view and manipulate trace files easily and rapidly. User-friendly trace analyzers use a Graphical User Interface viewer as described in the RD4108301 IBM article of the Research Disclosure journal Number 415 of Nov. 1998 published by Kenneth Mason Publication Ltd. A simple tree structure illustrates nested functions of the code. Error code searching and simple graphics are provided to display states of trace information. However, even using a graphical trace analyzer, it is not possible today to analyze more deeply the execution of nested functions. More particularly, there is a need for identifying the execution of functions not coded with exceptions, but coded with return codes. This is the case of code developed in operating systems when commands or applications have no need of exceptions. It would be of great help to be able to follow the execution of nested function calls and to know which of the nested functions of a thread of a multi-thread environment have not been executed successfully. When functions are nested, the programmer wants to diagnose the problem in the execution of a thread, tracking it in a tree structure of nested functions and identifying the nested functions that have failed. Non-fatal failures are very difficult to identify as the application being a deamon, despite an error, continues to run, always generating numerous trace logs. The cause of the error cannot be identified because the cause is hidden by a failing event or a correlation of failing events. So there is a need for easily and quickly analyzing a fairly big collection of tracing information (for instance, up to 10 Mbytes of trace log) to identify a problem that occurred sometime in the past and in a piece of code to be located and modified.

SUMMARY OF THE INVENTION

It is thus an object of the present invention to provide a method for tracing, during execution of a program, designated variable values, event statuses and information on entries and exits of functions.

A further object is to trace the results of execution of a thread of all nested functions using return codes.

It is also an object of the invention to be able to illustrate, in an easy way, the information from the results of the execution of all the nested functions.

These objects are reached by the use of a method of identifying errors in the source code, stored on a computer, using program components comprising nested functions which may use return codes and execute in a multithread environment, said method comprising the steps of:

using an editor operating on the computer, adding into the source code of said components at least the following macros: an ENTRY macro at the beginning of each function, an EXIT macro at the normal execution end of each function, a TRACE macro wherever specific information needs to be dumped, and a QUIT macro in the code in a place where an unexpected condition occurs;

compiling source code into executable code using a code source compiler on the computer;

executing said executable code on the computer including trace macro code; each time an ENTRY or EXIT macro being executed, logging a trace record in a trace file comprising the name of the corresponding function; each time a TRACE macro being executed, logging a trace record in the trace file comprising the dumped specific information; and, each time a QUIT macro is executed, logging a trace record in the trace file comprising the name of the corresponding function and jumping to the execution of the EXIT macro of said corresponding function.

These objects are further achieved by executing the method on a computer accessing the trace file, and, after a command has been entered at the computer, requesting the analysis of the trace file:

reading a trace record in the trace file;

if the trace record has been created by the execution of an ENTRY macro, displaying on a screen of the computer the function name as a representation of a node, becoming the current node of a tree illustrating the structure of the components comprising nested functions;

if the trace record has been created by the execution of a QUIT macro, marking on the screen the current node as a failing function, the parent tree node becoming the current node;

if the trace macro has been created by the execution of an EXIT macro, marking the current node on the screen as a successfully executed function, the parent tree node becoming the current node;

if the trace macro has not been created by the execution of an EXIT macro, storing in the memory of the computer the corresponding dumped specific information of the TRACE macro as a leaf of the current node;

repetitively executing the previous steps up to the end of the trace file.

With the tracing model of the present invention, the programmer can collect trace data with a semantic marking the success (EXIT macro) or failure (QUIT macro) in the execution of the nested functions called by specific threads. Then, using this semantic the programmer can selectively access this trace data and work on the corresponding source code in a user-friendly way.

If a function exits with a failure, this information can be raised up to a first function call. This is a principle similar to an exception. Using the trace analyzer, the developer can visualize which function was in error and at what level of nesting the error happened.

In a traditional trace model having only the 'exit with no error' tracing, in order to be able to identify the successful execution of the functions in a trace file, the developer will have to choose the lowest level of a filter for the trace messages, which generates a huge trace file that results in loss of readability. In contrast, with the trace analyzer of a trace generated with the tracing model of the present invention, the entire trace file is shown in a single view. The nodes in green on the function tree representation illustrate a successful execution of the function and the nodes in red on the function tree representation illustrate an unsuccessful execution of the function. The nodes in green can be collapsed in the trace view and the red nodes can be expanded, allowing viewing of the corresponding detailed trace information. Furthermore, once identified, the corresponding invalid portion of the code can be displayed on the same screen view.

Productivity is increased when debugging a complex program product using, for instance, C-language, which is multi-threaded and uses deamons. With the solution of the present invention, the time needed to find useful information in huge trace files is minimized.

DESCRIPTION OF A PREFERRED EMBODIMENT

Figure 1:
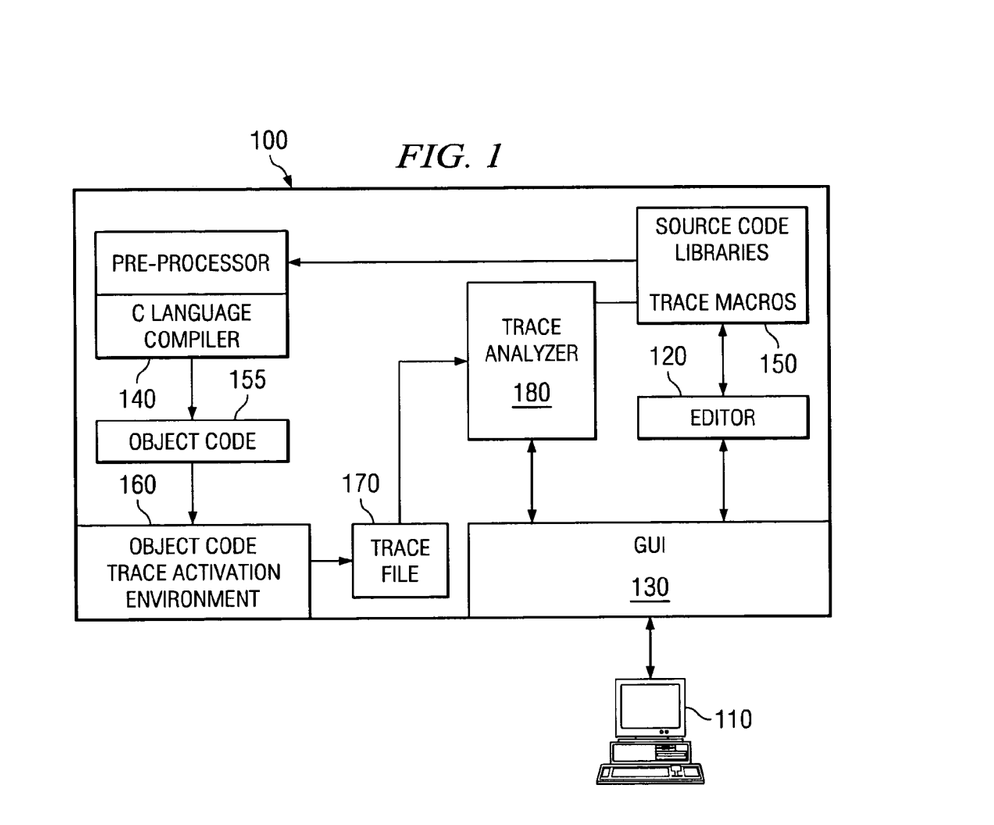
FIG. 1 illustrates a computing environment of a preferred embodiment.

FIG. 1 illustrates a computing environment implementing a trace method according to a preferred embodiment. Programs (100) are installed on a computer, which may be workstation (110) of the developer or a remote computer. The developer or programmer accesses source code from workstation (110) through editor (120) using graphical user interface (GUI, 130). Pre-processor and C language compiler programs (140) compile source code (150) that the programmer wants to test and which is stored in libraries. Code libraries are partitioned, each partition comprising a code component corresponding to the coding of a C language function. Source code (150) includes trace macros added by the programmer to his original source code that the programmer wants to test. Code macros, including the trace macros, are expanded by pre-processor (140), which generates intermediate macros to be compiled by C language compiler (140). The output of C language compiler (140) is object code (155), which is executed in object code trace activation environment (160), for instance as a process in a preferred embodiment. The trace is activated during code execution. One output of the code execution is trace file (170) where the trace is logged during program execution. This output completes the trace generation environment. In the same computer, or in a separate computer, trace file (170) is analyzed. The trace analyzer environment comprises trace file (170), trace analyzer program (180), which reads the trace lines in trace file (170), and a workstation user interface (screen, keyboards etc . . . ), such as workstation (110). Using a Graphical User Interface and using the facilities of the operating system of the workstation, trace analyzer (180) converts the trace lines of trace file (170) into a graphical representation of the execution of the code. The representation is displayed on the screen and the programmer or user can interactively ask the trace analyzer to perform trace classifications, give details on code execution, and finally display on the screen the source code of a function in error. This allows the developer to check where a problem is. When technical people maintain the code for a customer, they can inform the customer if a fix is needed or if a call just failed.

Figure 2:
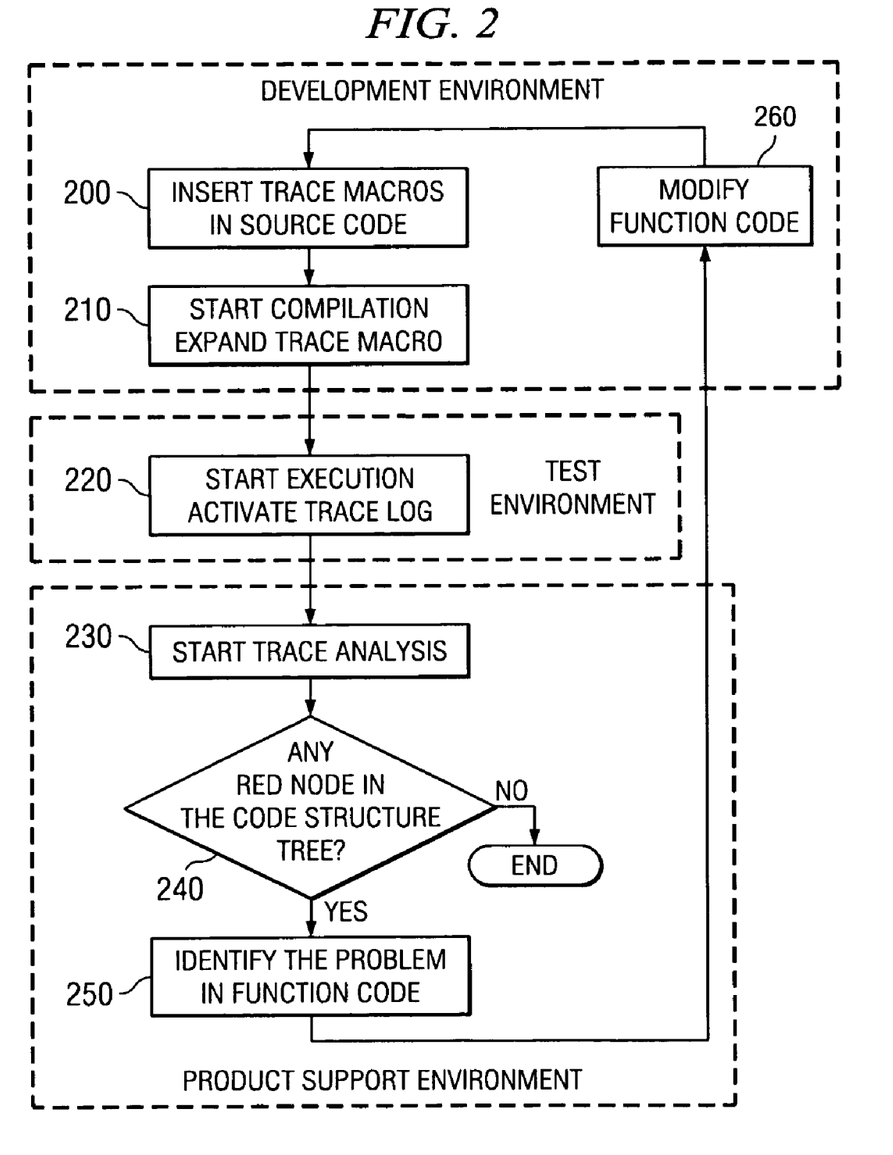
FIG. 2 is a general flowchart of a trace process according to a preferred embodiment.

FIG. 2 is a general flow chart describing steps performed by a developer using a method as implemented in a preferred embodiment. The first step (200) is performed by the developer, who introduces trace macros in each source code component. The details of macros of a preferred embodiment are described later in the specification. Trace macros are first used to mark the entry and the exit of a function. These macros are respectively located at the beginning and at the end of the function code. The entry and exit macros trace the beginning and the normal end of the execution of the function. Tracing entries and exits for each function generates a lot of trace, and this implies a large processing time and a large amount of trace information. A trace macro is used to tag a trace log with a line of text, and can also detail and print variable values. An additional macro in a preferred embodiment is a quit macro, which traces a failed execution of a function. The quit macro is located in the source code in the places where the normal execution flow is abandoned. The quit macro allows dumping of return code values. Additionally, a trace level is associated with each trace macro. This level qualifies how important this trace is, and this level is specified when starting trace logging during program execution.

The second step (210) is for compiling source code. During this step, a C pre-processor, such as pre-processor (140) in FIG. 1, expands the macros, according to the definitions, into code language, C language in a preferred embodiment, using an intermediate set of macros not available to the programmer (see detailed description later in the specification). These first two steps are accomplished in the development environment of the developer. This environment comprises a computer having an editor to modify the code and a language compiler, for instance a C language compiler, such as C language compiler (140) in FIG. 1. The language compiler has been enriched with a pre-processor for trace macro expansion into C language ready to be compiled by a standard language compiler.

The third step (220) is for executing the code and for activating the trace. These two activations can be done separately. In a customer environment, the trace is activated to be able to detect a problem in the execution of the customer. When activating a trace, a level of trace is specified. The trace macro code is executed simultaneously with the other lines of code. The actual execution of the expanded trace macros and the contributions inside the trace file is dependent on the level of trace set for the product and for each component. These set levels are compared with the level of the original macro. All qualifying macros contribute to the trace file simultaneously. This third step is performed in the test environment, which is in a computer. It can be performed on the same computer that the programmer used for development, or on a different computer, because the tests can be performed by different programmers or if the execution of the code requires a different computing environment.

The fourth step (230) is for analyzing the trace log file using a trace analyzer, such as trace analyzer (180) in FIG. 1. The trace file records, such as trace file (170) in FIG. 1, are read. Each execution of a function is detected in the trace file and displayed on the screen as a branch (also called node) of a tree representing the code component tree structure. The nested functions are represented as nodes and child nodes of the tree. If a function has been successfully executed, the node is colored in green. If a function execution has failed, the node is colored in red. A trace message logged during the execution of a function is displayed on the computer screen, for example by clicking a mouse of the computer on the corresponding node. The trace messages are the leaves of the nodes. With this visualization tool, the developer can, by clicking in a field near a node, display the function source code for the node in a separate window screen. If no tree node is red (answer NO to the test in step 240), this result means that no function exited in error, and the flow chart end is reached. If a node is red (answer YES to the test in step 240) the developer can view the corresponding source code and identify the error (step 250). This trace analyzing is performed in the product support environment, a computer able to run Graphical User Interface applications. The programmer or tester can use this part of the application during the development phase of the code. When the code is in production mode, the product support environment is the technical people doing maintenance on the code to identify problems in the code. Using the visualization of the tree of the execution, the developer can identify the node(s) or child node(s) in error for a given thread. The developer will change the source code (step 260) corresponding to the failing function(s), inserting new trace macros if necessary.

Figure 3:
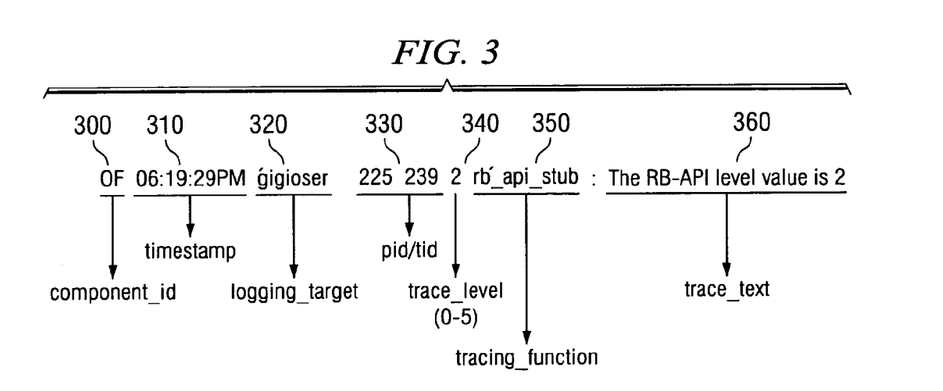
FIG. 3 is a trace line according to a preferred embodiment.

FIG. 3 is an example of trace line generated by a method of a preferred embodiment. The first two characters (300) represent the coded identification of a code component where the trace macro has been executed. The following character string (310) represents a timestamp dating the trace line recording. The 'logging target' field (320) identifies the client (in the client-server environment) which has sent a remote request to the server which is logging this trace. As a matter of fact, the server trace will comprise traces both from execution of its own processes and from execution of a specific code that a client has remotely requested to be executed. The next double field (330) includes the Process Identifier (PID) and the Thread Identifier (TID). Trace logging can be performed for one process identifier and a specific thread in the process if this process is a multithread process. This trace selection is useful for long running deamons. The next field (340) is the trace level, which may be a number from 0 to 5 characterizing the type of trace to which the trace line belongs. The following character string (350) in the trace line is the tracing function name. A character string follows (360) corresponding to a message coded by the developer identifying an event at execution time or the name of the trace macro marking, for instance, the beginning or the end of the execution of the corresponding function code. This character string may include variable values.

In a preferred embodiment the developer uses the following four macros in the source code to trace program execution:

TME_ENTRY, TRACE, TME_QUIT and TMEEXIT/TME-EXITNORC.

TME_ENTRY has one parameter, the function name which is a character string representing the name of the C function:

TME ENTRY (<function_name>)

The TME_ENTRY macro is inserted inside each C function as the first statement after all variable declarations. The object of this trace macro is to insert in each trace-line that may be generated by the current function the <function name> character string. Also, this macro is used by the trace analyzer to correlate the trace line with the source code of the function. As an example, these are the declarations for the function 'coexecpgm':

| DC_SHORT co_exec_pgm | (DC_VOID | * | tws, |
| | DC_CHAR | * | command, |
| | DC_ULONG | * | ccode, |
| | DC_CHAR | * | outfile) |
| { | | | |
| DC_LONG orig_uid = 0; | | | |
| ... | | | |
| TIME_ENTRY("co_exec_pgm"); | | | |

The result of trace macro execution in the trace log is:

27 06:19:29PM gigioser 225 239 0 co exec pgm : >>>>>>>ENTRY

This record advises that the execution of the coexecpgm function has started at the corresponding timestamp (06:19:29PM). The first field "27" identifies the component code component where the trace macro has been executed. The trace analyzer, when reading this trace line, executes the following commands to search in the built tree code (% buildtree %) for the function code. These commands are used also to start the GUI from UNIX® commands available on UNIX® workstations and Windows PC (Microsoft Windows is a trademark of Microsoft Corporation in the United States, other countries, or both. UNIX is a trademark of UNIX System Laboratories, Inc. Corporation in the United States, other countries, or both.):

| > cd %build_tree% |
| > grep \"co_exec_pgm\"    *.* |

The result of the search is:

| dvacoims.c: | TME_ENTRY("co_exec_pgm"); |

Consequently, the function is located in the dvacoims.c module.

The TRACE macro has the following syntax:
TRACE<x>(<format>, (<parameters>})

<format> is a character string in 'printf'-like format, representing some textual string to be dumped, possibly including reference to other parameters.

<parameters> is an optional list of variables defined in the context of the current function that may be added to the TRACE macro.

<x> is a numeric value (from 0=low level to 5=high level in a preferred embodiment) that qualifies the importance of the trace information. TRACE0 is for very low level information while TRACE4 and TRACE5 are used for tracing severe or fatal errors.

Wherever useful information needs to be dumped with or without parameters, the TRACE macro is inserted in the source code. The TRACE macro allows dumping of the context of the function and the values of the variables at this point of the execution. The TRACE <x> statement is actually dumped in the trace file only if the current product trace level is less than or equal to the <x> level.

If the product trace level is 6, no trace is generated by the program.

If the product trace level is 5, only TRACE5 statements are dumped.

If the product trace level is 4, only TRACE5/TRACE4 statements are dumped.

If the product trace level is 3, only TRACE5 to TRACE3 statements are dumped.

If the product trace level is 2, only TRACE5 to TRACE2 statements are dumped.

If the product trace level is 1, only TRACE5 to TRACE1 statements are dumped.

If the product trace level is 0, TRACE5 to TRACE0 statements are all dumped.

The product trace level is set at activation of the trace during program execution. In a preferred embodiment, a product trace level can be set for each component.

As an example, hereafter are provided code and traces generated by "coexecpgm" if the product trace level for component 'CO' (common routines) is less than or equal to 2.

Code:

```
DC_SHORT co_exec_pgm (DC_VOID  *  tws,
                      DC_CHAR   *  command,
                      DC_ULONG  *  ccode,
                      DC_CHAR   *  outfile)
{
    DC_LONG orig_uid = 0;
    ...
    TME_ENTRY("co_exec_pgm");
    ...
    TRACE2( )"Starting program %s", command));
        if (!co_full_path(tws,command))
        {
            TRACE4( )"full path name not found"));
```

At execution, the corresponding trace file records are:

| | | |
|---|---|---|
| 27 06:19:29PM gigioser | 225 239 0 co_exec_pgm | : >>>>>>>>>> ENTRY |
| 01 06:19:29PM gigioser | 225 239 2 co_exec_pgm | : Starting program c:\calc.exe |
| 01 06:19:30PM gigioser | 225 239 4 co_exec_pgm | : full path name not found |

A programmer can use a TME_QUIT trace macro inside a function code, in the code locations where a failure needs to be detected and when the normal flow of the current function has to be abandoned. Using this macro, the programmer may track an unexpected condition in the trace. The programmer may want to set the failing return code before using such a macro. The programmer may also want to log a warning/error trace before using such a macro. This macro is the key to distinguishing between a 'normal' exit and a 'failure' exit from inside a function. The GUI trace analyzer is able to detect that such a 'failure' occurred, and mark the function as failed (by a red color in the code tree structure displayed on the screen).

The calling function, detecting the return code, may keep TME_QUIT-ting, in which case the failure (red color) is propagated upwards, or may handle the failure, in which case the failure propagation (red color) is stopped and the caller function terminates with a TME_EXIT, if no other errors occurs. This is illustrated with the GUI trace analyzer snapshot described later in reference to FIG. 4.

As illustrated in the example provided later with the TME_EXIT macros, the implementation of TME_QUIT dumps a specific TAG (<><><><><>QUITTING) in the trace file and jumps to the end of the function where the exiting return code is also dumped.

The TME_EXIT and TME_EXIT_NO_RC trace macros have the following syntax:

TME_EXIT (<rc>)

TME_EXIT_NO_RC( )

<rc>is the return code of the current function. If the current function is returning a 'void', the TME_EXIT_NO_RC macro must be used. A programmer uses only one TME_EXIT statement (or TME_EXIT_NO_RC for functions defined as 'void') inside a function. Such a macro should be the last statement of the function. TME_EXIT (<rc>) and TME_EXIT_NO_RC( ) each provide a jumping label, so that all the TME_QUIT macros of the function can jump to this point. Such macros mark the end of records of the current function inside the trace file.

Hereafter is a sample code snippet including TME_ENTRY, TME_QUIT and TME_EXIT trace macros:

```
DC_SHORT co_exec_pgm  (DC_VOID   *  tws,
                       DC_CHAR    *  command,
                       DC_ULONG   *  ccode,
                       DC CHAR    *  outfile)
{
    ...
    TME_ENTRY ("co_exec_pgm");
    ...
    rc = WinExec(command, SW_SHOWNORMAL, &process_id);
    if(rc < 32)
    {
        TRACE5( )"Unable to execute program %s (rc = %ld)",
command, errno));
        rc = CO_ERR_EXEC_FAILED;            // 1003
        TME_QUIT;
    }
    ...
    rc = GetExitCodeProcess(process_id);
    if(rc >= WARNING_EXIT_CODE)
    {
        TRACE5( )"Program %s executed with warnings (rc = %ld)",
command, rc));
        rc = CO_ERR_EXEC_WITH_WARNINGS;   // 1004
        TME_QUIT;
    }
    TRACE2( )"Program %s executed successfully", command));
    rc = DC_OK;
    TME_EXIT_RC("%hx", rc);
}
```

The two following examples illustrate the result of a QUIT macro in a case of an error. In these two examples the ENTRY macro generates a trace line identifying the beginning of execution of the function, a TRACE macro provides a text describing the error and the return code of the function, the QUIT macro generates a quitting trace line message indicating that the function has failed and jumps to the EXIT macro at the end of the function, where a new trace line is generated by the EXIT macro identifying the end of the function. The first example includes trace records in the trace file generated by the code above in case of a 'file not found' error:

```
27 06:19:29PM gigioser    225 239 0 co_exec_pgm    : >>>>>>>>>> ENTRY
01 06:19:29PM gigioser    225 239 5 co_exec_pgm    : Unable to execute program c:\calc.exe (rc = 2)
27 06:19:30PM gigioser    225 239 0 co_exec_pgm    : <><><><><> QUITTING
27 06:19:30PM gigioser    225 239 0 co_exec_pgm    : return data = 1003
27 06:19:30PM gigioser    225 239 0 co_exec_pgm    : <<<<<<<<<< EXIT
```

A second example is trace records in a trace file generated by the code above in case of an 'execution with warnings' error:

```
27 06:19:29PM gigioser    225 239 0 co_exec_pgm    : >>>>>>>>>> ENTRY
01 06:19:29PM gigioser    225 239 5 co_exec_pgm    : Program c:\calc.exe executed with warnings (rc = 5)
27 06:19:30PM gigioser    225 239 0 co_exec_pgm    : <><><><><> QUITTING
27 06:19:30PM gigioser    225 239 0 co_exec_pgm    : return data = 1004
27 06:19:30PM gigioser    225 239 0 co_exec_pgm    : <<<<<<<<<< EXIT
```

The following is possible trace records in a trace file generated by the above code in case of an 'execution without warnings' error:

```
27 06:19:29PM gigioser    225 239 0 co_exec_pgm    : >>>>>>>>>> ENTRY
01 06:19:29PM gigioser    225 239 2 co_exec_pgm    : Program c:\calc.exe executed successfully
27 06:19:30PM gigioser    225 239 0 co_exec_pgm    : return data = 0
27 06:19:30PM gigioser    225 239 0 co_exec_pgm    : <<<<<<<<<< EXIT
```

The following macros or APIs are not available to the programmer:

TME_EXIT_POINT, TME_EXIT_RC/TME_EXIT_VOID, TRACEIO, TRC, co_trc, and co_trc_test.

In a preferred embodiment, at compilation time, these macros are built by the expansion of the TME_ENTRY, TRACE, TME_QUIT, and TME_EXIT/TME_EXIT_NO_RC trace macros used in the source code by the programmer.

TME_EXIT_POINT is a jumping label that TME_QUIT refers to.

TME_EXIT_RC is used by TME_EXIT (not 'void' function case).

TME_EXIT_VOID is used by TME_EXIT_NO_RC ('void' function case).

TRACEIO is the actual logging macro referred to by all macros but TRACE<x>.

TRC is invoked by TRACEIO or TRACE<x>, and handles the per-component log level.

co_trc_test ( )

is a C language function that checks the logging level.

co_trc ( )

is a C language function that does the trace logging.

The C compiler pre-processor of a preferred embodiment converts trace macros used by the programmer to the set of macros above and applies successive conversions to obtain C language functions according to the following example of a programmer trace macros definition using TRACEIO:

```
#define TME_ENTRY(x)      static DC_CHAR TME_trcmod[]=x; \
                          TRACEIO( )">>>>>>>>>>
                          ENTRY"))
#define TME_QUIT          TRACEIO( )"<><><><><>           \
                          QUITTING"));
                          goto TME_exit
#define TME_EXIT_RC(x, rc) TRACEIO( )"return data = " x , rc)); \
                          TRACEIO( )"<<<<<<<<<< EXIT")); \
                          return rc
#define TME_EXIT_VOID     TRACEIO( )"<<<<<<<<<< EXIT")); \
                          return
#define TME_EXIT_POINT    TME_exit:
#define TME_EXIT(x)       TME_EXIT_POINT; TME_EXIT_
                          RC("%hx", x)
#define TME_EXIT_NO_      TME_EXIT_POINT; TME_EXIT_
RC( )                     VOID
```

TRACEIO/TRACE<x> macro definitions expand into TRC, depending on the Component/Level. In the following example, COMMID/DASID/GIID/ . . . are compiler definitions activated for components COMM/DAS/GI—

| | | |
|---|---|---|
| #define | TRACEIO( ) | TRC(5,TME_INOUT,(tws, 0, TME_INOUT, TME_trcmod, |
| #ifdef | COMMID | |
| #define | TRACE0( ) | TRC(0,TME_CO,(tws, 0, TME_CO, TME_trcmod, |
| #define | TRACE1( ) | TRC(1,TME_CO,(tws, 1, TME_CO, TME_trcmod, |
| #define | TRACE2( ) | TRC(2,TME_CO,(tws, 2, TME_CO, TME_trcmod, |
| #define | TRACE3( ) | TRC(3,TME_CO,(tws, 3, TME_CO, TME_trcmod, |
| #define | TRACE4( ) | TRC(4,TME_CO,(tws, 4, TME_CO, TME_trcmod, |
| #define | TRACE5( ) | TRC(5,TME_CO,(tws, 5, TME_CO, TME_trcmod, |
| #elif | DASID | |
| #define | TRACE0( ) | TRC(0,TME_DB,(tws, 0, TME_DB, TME_trcmod, |
| #define | TRACE1( ) | TRC(1,TME_DB,(tws, 1, TME_DB, TME_trcmod, |
| #define | TRACE2( ) | TRC(2,TME_DB,(tws, 2, TME_DB, TME_trcmod, |
| #define | TRACE3( ) | TRC(3,TME_DB,(tws, 3, TME_DB, TME_trcmod, |
| #define | TRACE4( ) | TRC(4,TME_DB,(tws, 4, TME_DB, TME_trcmod, |
| #define | TRACE5( ) | TRC(5,TME_DB,(tws, 5, TME_DB, TME_trcmod, |
| #elif | GIID | |
| .... | | |

In the following example, TMECO/TMEDB/ . . . are the constants associated with each component. 01, 02, 03, 04, . . . , 27 are the component IDs appearing as the first field of the trace line as illustrated in FIG. 3.

| | | |
|---|---|---|
| #define | TME_CO | 0x01 |
| #define | TME_DB | 0x02 |
| #define | TME_GI | 0x03 |
| #define | TME_CC | 0x04 |
| ... | | |
| #define | TME_INOUT | 0x27 |

TRC macro definitions expand into co_trc C function, depending on the per-component trace level:

Depending of which trace level is set for the overall product, or which trace level is set for each specific component, the execution of each C function makes a contribution to the trace file, according to the trace macros that are executed during the processing.

Like in any other trace analyzer tool, the trace analyzer of the preferred embodiment accesses the trace file and can sort, group, or filter the trace lines by component, process, thread, and time for each field of a trace line, as described in FIG. 3. The trace analyzer uses Microsoft Windows® GUI or any UNIX® Graphic Terminal in the preferred embodiment.

Figure 4:
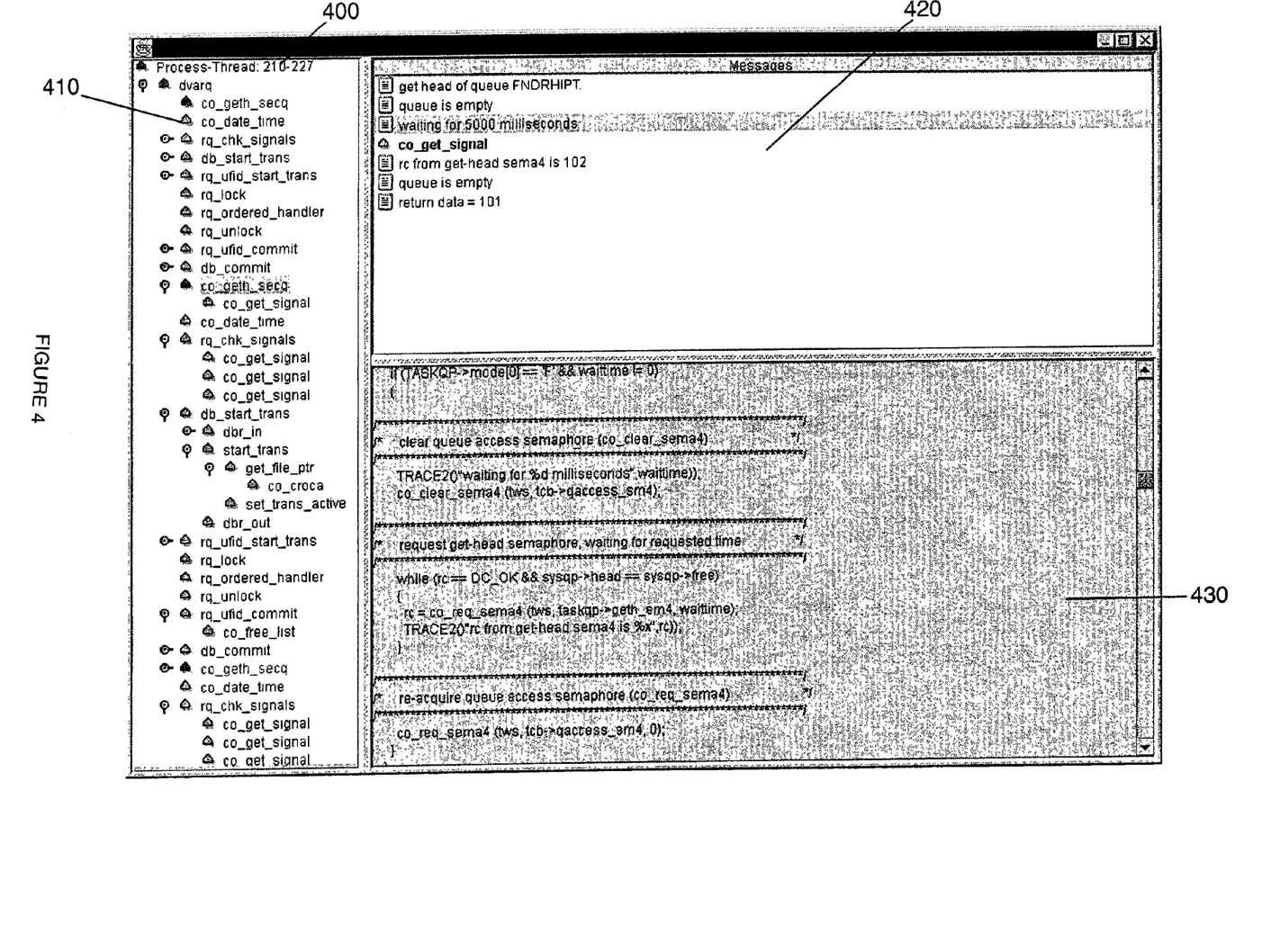
FIG. 4 is a screen print provided by a trace analyzer according to a preferred embodiment for a 1 MB trace file.

FIG. 4 depicts a print screen displayed on a screen of a trace analyzer of a preferred embodiment. The example provided is extracted from a 1 Mbyte trace file containing trace lines for the execution of a series of C functions nested in different threads. On the screen is represented process thread (400) identified by the IDs 210–227 stored in double field (330) in FIG. 3. This screen has been displayed after a startup dialog (a menu can be used as well), via the GUI, has allowed the user to choose the process and/or thread execution the user wants to analyze. On the left part of the screen is represented tree structure (410) formed by a representation on the screen of the C functions nested in threads 210–227. In this example the C functions are represented by their name. The C function representations form the 'nodes' of the tree. Each node is created by reading the ENTRY, QUIT and EXIT macro lines. The leaves attached to each node correspond to the TRACE macro line messages. Each triangle at the left side of the node identifies a C function. The triangles are either red or green. When the triangle is red, this means the C function execution failed. When the triangle is green, this means the C function was executed successfully. Two other signs are used at the left side of each triangle. Clicking on a specific node name in the tree structure representation causes the node structure to be expanded and the

```
#define TRC(1,c,p)                              \
        if (co_trc_test(tws, 1, c) == TRUE)     \
        {                                       \
            co_trc p;                           \
        }
co_trc C function definition:
DC_VOID co_trc(DC_VOID* tws, DC_USHORT level, DC_USHORT comp, DC_CHAR* module,
    DC_CHAR* format, ...)
/************************************************************************/
/* Description:                                                         */
/*     Write the trace message to the trace file.                       */
/* Parameters:                                                          */
/*     tws                                                              */
/*     level                                                            */
/*     comp                                                             */
/*     module                                                           */
/************************************************************************/
{
    va_list arg_ptr;
    va_start(arg_ptr, format);
    vsprintf(TME_TCB->trc_txt, format, arg_ptr);
    ...
}
```

'0-'
sign is displayed on the left side of the node triangle. When the node structure is expanded, all the nested functions are displayed as child tree nodes. The node structure can be collapsed again by clicking a second time on the node name. In this case the "0-" sign appears on the left side of the node triangle. In the top right portion of the screen (420) an expanded view of the trace messages generated during the execution of the co_geth_secq C function is displayed. This expansion is for the failing execution of the co_geth_secq C function located at the thirteenth line of the tree structure displayed on the left of the screen. The co_geth_secq C function includes the nested co_get_signal C function for which the trace messages are displayed, displayed as well in the top right side of the screen. The bottom right part of the screen (430) contains the code lines corresponding to the C function for which the messages have been displayed in the top right part of the screen. By viewing these code lines, the programmer can understand the error and fix the error. Using the facilities of GUI, a person of ordinary skill in the art could also add to this screen a line of commands for the activation of other useful services, such as sorting, grouping, or filtering the trace lines in the trace file by component, process, thread, or any other field in trace lines. In the preferred embodiment, with the GUI being written in Java™ programming language, there is no need of an intermediate file result of filtering, grouping, or sorting. With the '-mx' switch of the Java™ Virtual Machine (JVM), one can ask for as much memory as is needed, such as 50 MB to 100 MB.

Figure 5:
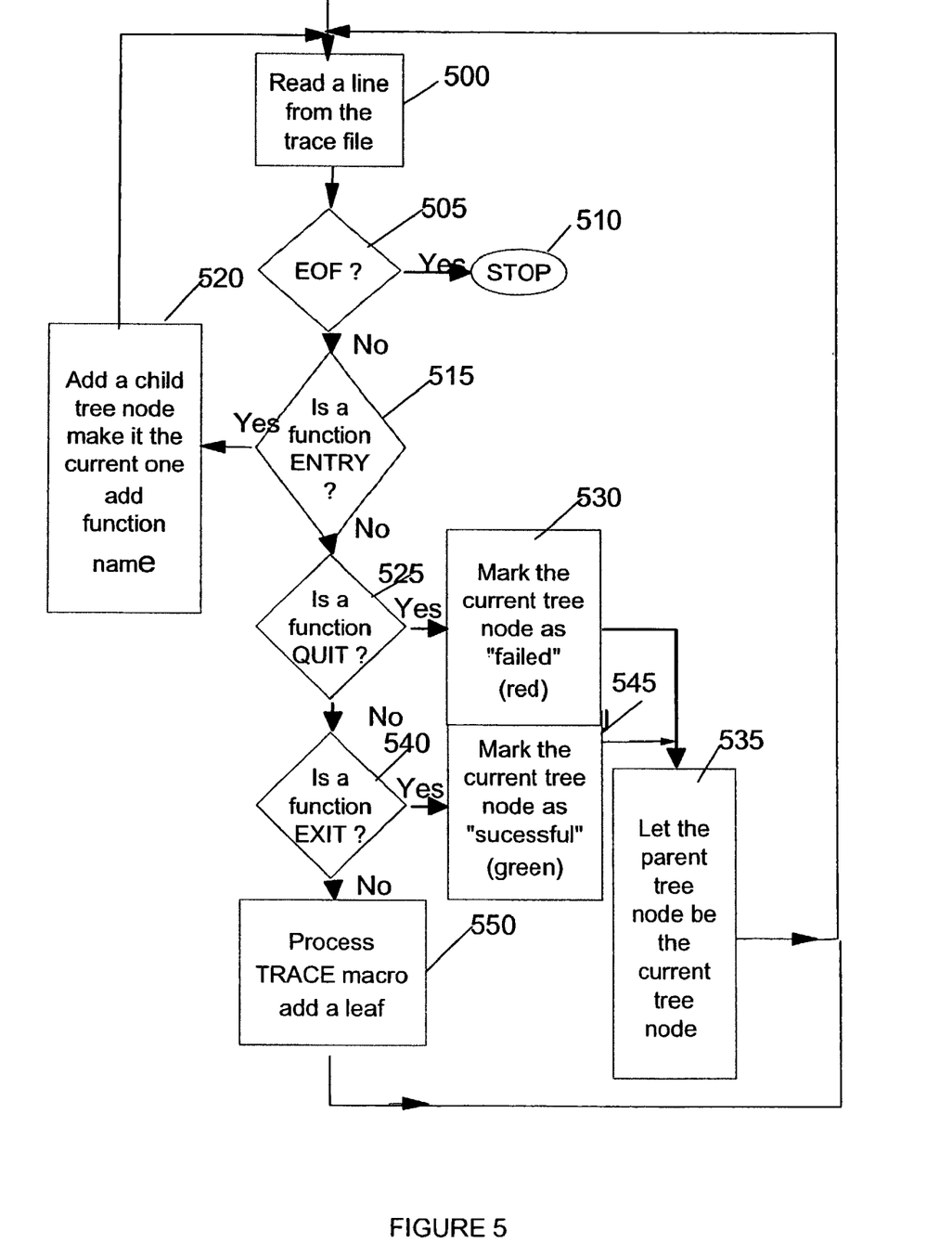
FIG. 5 is a general flowchart for an interpretation of a trace file by a trace analyzer according to a preferred embodiment.

FIG. 5 is a flow chart of a method implemented in a trace analyzer of a preferred embodiment to display a tree structure of a nested C function on a screen as described in FIG. 4. The flow chart is a loop for reading the trace file lines. A trace line is read (500), and if the end of file is reached (test 505) the algorithm is ended (510). If the end of file is not reached, the trace line is tested (test 515) to see if it has been generated by an ENTRY trace macro. If this is an ENTRY trace macro line, a new child tree node is attached (logically) to the current parent node and displayed on the screen (520) with the name of the C function, the child node becomes the current node, and the next trace line is read (500). If the trace line tested is not an ENTRY trace macro line, the trace line is tested (test 525) to see if the trace line has been generated by a QUIT trace macro. If the trace line has been generated by a QUIT trace macro, the triangle in front of the C function name in the tree structure displayed on the screen is colored in red (530) to advise that the C function execution has failed. The parent tree node becomes the current node (535) and a new trace line is read (500). If the trace line tested is not a QUIT trace macro line, the trace line is tested (test 540) to see if the trace line has been generated by an EXIT trace macro. If the trace line tested has been generated by an EXIT trace macro line, the triangle in front of the C function name in the tree structure displayed on the screen is colored in green (545) to advise of the successful execution of the C function, the parent tree node becomes the current node, and a new trace line is then read. If the trace line tested has not been generated by an EXIT trace macro line, this means that this trace line has been generated by a TRACE macro line, a new leaf is attached to the current node, the message attached to this leaf is stored, and the message will be displayed on the screen (550). As described in FIG. 4, the leaves are displayed in the top right part of the screen when the user requires it. Then, the next trace line is read (500).

The invention claimed is:

1. A method for identifying errors, in a source code stored on a computer, of program components having nested functions which may use return codes and which are executed in a multithread environment, said method comprising the steps of:

using an editor operating on the computer, adding, in the source code of the program components, the following macros: an ENTRY macro at a beginning of each function, an EXIT macro at a normal execution end of each function, a TRACE macro wherever specific information needs to be dumped and a QUIT macro in a place where an unexpected condition occurs;

compiling the source code into executable code using a code source compiler on the computer;

executing said executable code, including trace macro code, wherein each time one of the ENTRY or EXIT macros is executed, logging a trace record in a trace file including a name of the corresponding function, each time a TRACE macro is executed, logging a trace record in the trace file including the dumped specific information, and, each time a QUIT macro is executed, logging a trace record in the trace file comprising the name of the corresponding function, and jumping to an execution of the EXIT macro of said corresponding function;

reading a selected trace record in the trace file;

if the selected trace record has been created by execution of an ENTRY macro, displaying on a screen of the computer the function name as a representation of a node, the node becoming a current node, of a tree illustrating a structure of the program components comprising nested functions;

if the selected trace record has been created by execution of a QUIT macro, marking on the screen the current node as a failing function, a parent tree node becoming the current node;

if the trace macro has been created by execution of an EXIT macro, marking the current node on the screen as a successfully executed function, the parent tree node becoming the current node;

if the trace macro has not been created by execution of an EXIT macro, storing in a memory of the computer the corresponding dumped specific information of the TRACE macro as a leaf of the current node; and repetitively executing the previous steps up to an end of the trace file.

2. The method of claim 1 further comprising the steps of:

in response to an expand command, expanding one or more child tree nodes of a selected tree node by displaying on the screen a list of nested functions executed in a given function;

in response to a collapse command, collapsing the child tree nodes of tree selected tree node by suppressing on the screen the list of nested functions executed in the given function.

3. The method of claim 2 wherein the expand command and the collapse command are executed as mouse clicks on the tree node representation on the screen.

4. The method of claim 1 further comprising the step of displaying, upon entry of a command on the computer designating a specific node, one or more leaves stored for the specific node.

5. The method of claim 1 further comprising, upon entry of a command on the computer designating a specific node, the steps of:
   reading the function name of the specific tree node in the ENTRY macro trace record;
   accessing the corresponding source code in the program component source code; and
   displaying said source code on the screen.

6. The method of claim 1 wherein the specific dumped information of the TRACE macro comprises character strings or variable values including a function return code value.

7. The method of claim 1 where the trace logging is activated as a separate request from executing the executable code of the program components.

8. The method of claim 7 where a level of trace is associated when coding each TRACE macro and when a level is specified at trace logging activation, only the TRACE macro execution having a level less than or equal to the level specified at trace logging will generate trace logging in the trace file.

9. The method of claim 1 wherein the trace record comprises an identifier of the component being executed, a time stamp, the name of the function and trace text identifying an EXIT or ENTRY or QUIT macro or being a TRACE macro text.

10. The method of claim 1 further comprising grouping the trace records by component, process or thread.

11. The method of claim 1 wherein marking a node on the screen as a successfully executed function is done by coloring the representation of the node in green and wherein marking on the screen a node as a failing function is done by coloring the representation of the node in red.

12. An information handling system for identifying errors, in a source code stored on the system, of program components having nested functions which may use return codes and which are executed in a multithread environment, said system comprising:
   an editor for adding, in the source code of the program components, the following macros: an ENTRY macro at a beginning of each function, an EXIT macro at a normal execution end of each function, a TRACE macro wherever specific information needs to be dumped and a QUIT macro in a place where an unexpected condition occurs;
   a code source compiler for compiling the source code into executable code on the system;
   means for executing the executable code, including trace macro code, wherein each time one of the ENTRY or EXIT macros is executed, a trace record is logged in a trace file including a name of the corresponding function, each time a TRACE macro is executed, a trace record is logged in the trace file including the dumped specific information, and, each time a QUIT macro is executed, a trace record is logged in the trace file comprising the name of the corresponding function, and execution jumps to the EXIT macro of said corresponding function;
   means for reading a selected trace record in the trace file;
   if the selected trace record has been created by execution of an ENTRY macro, means for displaying, on a screen of a display device, the function name as a representation of a node, the node becoming a current node, of a tree illustrating a structure of the program components comprising nested functions;
   if the selected trace record has been created by execution of a QUIT macro, means for marking on the screen the current node as a failing function, a parent tree node becoming the current node;
   if the trace macro has been created by execution of an EXIT macro, means for marking the current node on the screen as a successfully executed function, the parent tree node becoming the current node; and
   if the trace macro has not been created by execution of an EXIT macro, means for storing in a memory of the system, the corresponding dumped specific information of the TRACE macro as a leaf of the current node.

13. The system of claim 12 further comprising:
   in response to an expand command, means for expanding one or more child tree nodes of a selected tree node by displaying on the screen a list of nested functions executed in a given function;
   in response to a collapse command, means for collapsing the child tree nodes of the selected tree node by suppressing on the screen the list of nested functions executed in the given function.

14. The system of claim 13 wherein the expand command and the collapse command are executed as mouse clicks on the tree node representation on the screen.

15. The system of claim 12 further comprising means for displaying, upon entry of a command designating a specific node, one or more leaves stored for the specific node.

16. The system of claim 12 further comprising, upon entry of a command designating a specific node:
   means for reading the function name of the specific tree node in the ENTRY macro trace record;
   means for accessing the corresponding source code in the program component source code; and
   means for displaying said source code on the screen.

17. The system of claim 12 wherein the means for marking a node on the screen as a successfully executed function includes means for coloring the representation of the node in green and wherein the means for marking on the screen a node as a failing function includes means for coloring the representation of the node in red.

18. The system of claim 12 wherein the specific dumped information of the TRACE macro comprises character strings or variable values including a function return code value.

19. The system of claim 12 further comprising means for activating trace logging as a separate request from executing the executable code of the program components.

20. The system of claim 19 further comprising means for associating a level of trace when coding each TRACE macro and means for specifying a level at trace logging activation, wherein only the TRACE macro execution having a level less than or equal to the level specified at trace logging will generate trace logging in the trace file.

21. The system of claim 12 wherein the trace record comprises an identifier of the component being executed, a time stamp, the name of the function and trace text identifying an EXIT or ENTRY or QUIT macro or being a TRACE macro text.

22. The system of claim 12 further comprising means for grouping the trace records by component, process or thread.

23. A computer program product stored in a computer operable media for identifying errors, in source codes stored on a computer system, of program components having nested functions which may use return codes and which are executed in a multithread environment, said program product comprising:
   means for using an editor for adding, in the source code of the program components, the following macros: an ENTRY macro at a beginning of each function, an EXIT macro at a normal execution end of each function, a TRACE macro wherever a specific information needs to be dumped and a QUIT macro in a place where an unexpected condition occurs;

means for compiling the source code into executable code on the computer system;

means for executing the executable code, including trace macro code, wherein each time one of the ENTRY or EXIT macros is executed, a trace record is logged in a trace file including a name of the corresponding function, each time a TRACE macro is executed, a trace record is logged in the trace file including the dumped specific information, and, each time a QUIT macro is executed, a trace record is logged in the trace file comprising the name of the corresponding function, and execution jumps to the EXIT macro of said corresponding function;

means for reading a selected trace record in the trace file;

if the selected trace record has been created by execution of an ENTRY macro, means for displaying, on a screen of a display device, the function name as a representation of a node, the node becoming a current node of a tree illustrating a structure of the program components comprising nested functions;

if the selected trace record has been created by execution of a QUIT macro, means for marking on the screen the current node as a failing function, a parent tree node becoming the current node;

if the trace macro has been created by execution of an EXIT macro, means for marking the current node on the screen as a successfully executed function, the parent tree node becoming the current node; and if the trace macro has not been created by execution of an EXIT macro, means for storing in a memory of the computer system, the corresponding dumped specific information of the TRACE macro as a leaf of the current node.

24. The computer program product of claim 23 further comprising:

in response to an expand command, means for expanding one or more child tree nodes of a selected tree node by displaying on the screen a list of nested functions executed in a given function;

in response to a collapse command, means for collapsing the child tree nodes of the selected tree node by suppressing on the screen the list of nested functions executed in a given function.

25. The computer program product of claim 24 wherein the expand command and the collapse command are executed as mouse clicks on the tree node representation on the screen.

26. The computer program product of claim 23 further comprising means for displaying, upon entry of a command on the computer system designating a specific node, one or more leaves stored for the specific node.

27. The computer program product of claim 23 further comprising, upon entry of a command on the computer system designating a specific node:

means for reading the function name of the specific tree node in the ENTRY macro trace record;

means for accessing the corresponding source code in the program component source code; and means for displaying said source code on the screen.

28. The computer program product of claim 23 wherein the means for marking a node on the screen as a successfully executed function includes means for coloring the representation of the node in green and wherein the means for marking on the screen a node as a failing function includes means for coloring the representation of the node in red.

29. The computer program product of claim 23 wherein the specific dumped information of the TRACE macro comprises character strings or variable values including a function return code value.

30. The computer program product of claim 23 further comprising means for activating race logging as a separate request from executing the executable code of the program components.

31. The computer program product of claim 30 further comprising means for associating a level of trace when coding each TRACE macro and means for specifying a level at trace logging activation, wherein only the TRACE, macro execution having a level less than or equal to the level specified at trace logging will generate trace logging in the trace file.

32. The computer program product of claim 23 wherein the trace record comprises an identifier of the component being executed, a time stamp, the name of the function and trace text identifying an EXIT or ENTRY or QUIT macro or being a TRACE macro text.

33. The computer program product of claim 23 further comprising means for grouping the trace records by component, process or thread.

* * * * *